United States Patent [19]

Paffrath

[11] 4,391,379
[45] Jul. 5, 1983

[54] LIFTING APPARATUS ADAPTED FOR MOUNTING IN A VEHICLE TRUNK

[75] Inventor: Edgar C. Paffrath, Birch Run, Mich.

[73] Assignee: Amigo Sales, Inc., Bridgeport, Mich.

[21] Appl. No.: 311,411

[22] Filed: Oct. 14, 1981

[51] Int. Cl.³ .................................................. B66C 23/44
[52] U.S. Cl. .................................. 212/187; 92/23; 248/280.1; 414/462; 414/543; 414/720; 414/921
[58] Field of Search .............. 414/462, 542, 543, 680, 414/719, 720, 921; 212/187, 188, 195, 223, 253, 254; 248/280.1, 281.1, 652, 654, 660; 267/64.12; 92/23, 134

[56] References Cited

U.S. PATENT DOCUMENTS

| | | | |
|---|---|---|---|
| 2,461,401 | 2/1949 | Trombley | 414/543 |
| 2,947,425 | 8/1960 | Nichols | 414/543 X |
| 3,095,099 | 6/1963 | Costello | 414/542 |
| 3,883,126 | 5/1975 | Nicholls | 267/64.12 |
| 3,982,648 | 9/1976 | Luedtke et al. | 92/23 X |
| 4,039,093 | 8/1977 | Schmitz et al. | 414/680 |
| 4,073,345 | 2/1978 | Miller | 92/23 X |
| 4,091,488 | 5/1978 | Artzberger | 267/64.12 X |
| 4,127,200 | 11/1978 | Mann | 414/462 X |
| 4,265,147 | 5/1981 | Fox | 248/654 X |

FOREIGN PATENT DOCUMENTS 537091 12/1955 Italy ..................................... 414/680

*Primary Examiner*—Leslie J. Paperner
*Attorney, Agent, or Firm*—Learman & McCulloch

[57] ABSTRACT

A lifting device adapted to be mounted within an automobile trunk is disclosed as having a rigid boom mounted for free pivotal movement about both vertical and horizontal axes. The lifting device includes a motor-driven lift mounted at the distal end of the boom. A counterbalance member is employed to counterbalance the gravitational force biasing the boom in downward movement about its horizontal axis so that the boom may be easily pivoted upwardly or downwardly by a handicapped person. A prop assembly may be manually moved into position to positively maintain the boom in an elevated lifting position.

3 Claims, 4 Drawing Figures

U.S. Patent  Jul. 5, 1983  Sheet 2 of 2  4,391,379
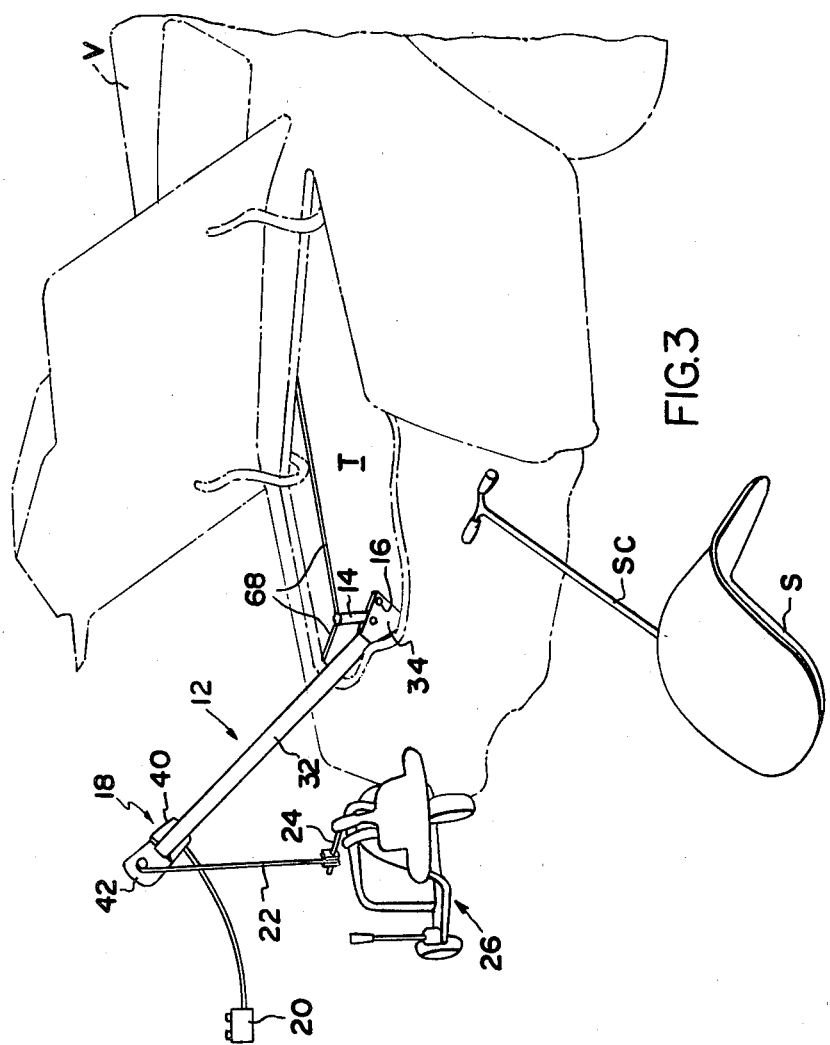
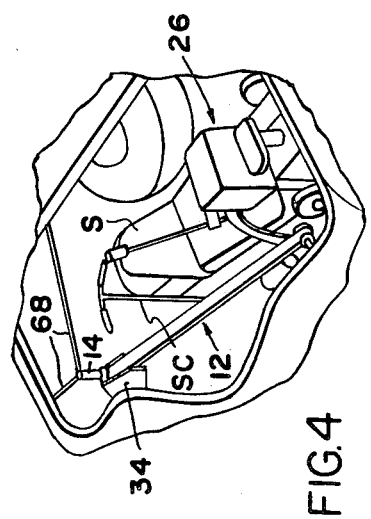
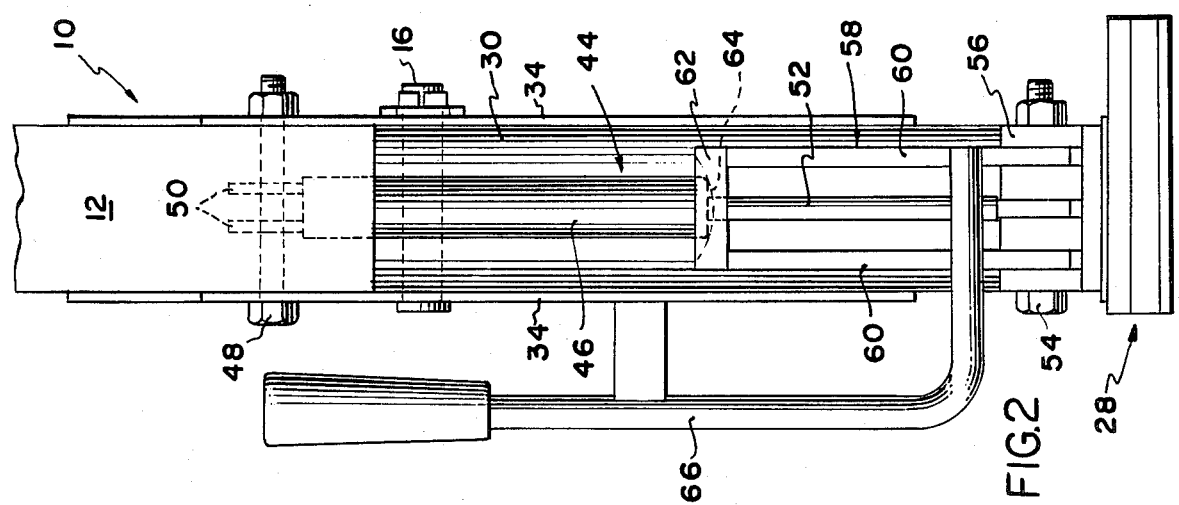

LIFTING APPARATUS ADAPTED FOR MOUNTING IN A VEHICLE TRUNK

BACKGROUND OF THE INVENTION

The present invention is especially directed to a device by means of which a small power driven vehicle of the type used by handicapped persons may be lifted into and out of an automobile. In a commonly owned copending application Ser. No. 202,642 filed Oct. 31, 1980, there is disclosed and claimed a lifting device by means of which a handicapped person can easily load and unload a small motorized cart into and out of the rear passenger compartment of a four door-type vehicle. The lifting device of application Ser. No. 202,642 is, however, designed for those situations in which the track upon which the lifting device is supported may be mounted on an overhead framework, such as the interior roof of the vehicle. It requires a side door-type opening through which access may be had to the interior of the vehicle, and is thus not especially suited for vehicles other than four door automobiles or vans which have a side or rear door access to a portion of the vehicle other than the front seat.

While trunk mounted lift devices are disclosed in the prior art, see, for example, U.S. Pat. Nos. 3,804,263 and 4,127,200, the lifting devices of the prior art in general are either difficult for handicapped persons to operate or to move between a stored position within the trunk and an elevated lifting position for handling the vehicle which is to be stored.

SUMMARY OF THE INVENTION

A lifting device embodying the present invention includes an elongate rigid boom assembly which is mounted at one end for pivotal movement about a vertical axis at a rear corner of the trunk compartment of an automobile. The boom is also mounted at its one end for free pivotal movement about a horizontal axis. At the outer or distal end of the boom, a power driven lift assembly operates a drum upon which a lifting "cable" in the form of a nylon tape is wound. The lifting device is driven by an electric reversible electric motor. A counterbalancing device counterbalances the cantilevered weight of the boom about its horizontal axis so that the boom may be easily pivoted manually about the horizontal axis between a substantially horizontal stored position adjacent the trunk floor and an upwardly and outwardly inclined lifting position. A manually operable prop assembly is engageable with the counterbalancing element to positively maintain the boom in its elevated position.

Other objects and features of the invention will become apparent by reference to the following specification and to the drawings.

IN THE DRAWINGS

FIG. 2 is a detailed front elevational view of the lower portion of the lifting device of FIG. 1;

FIG. 3 is a perspective view showing the device mounted in an automobile trunk and in the act of lifting a vehicular body to trunk level; and FIG. 4 is a partial perspective view showing the device in a stored position in an automobile trunk.

Figure 1:
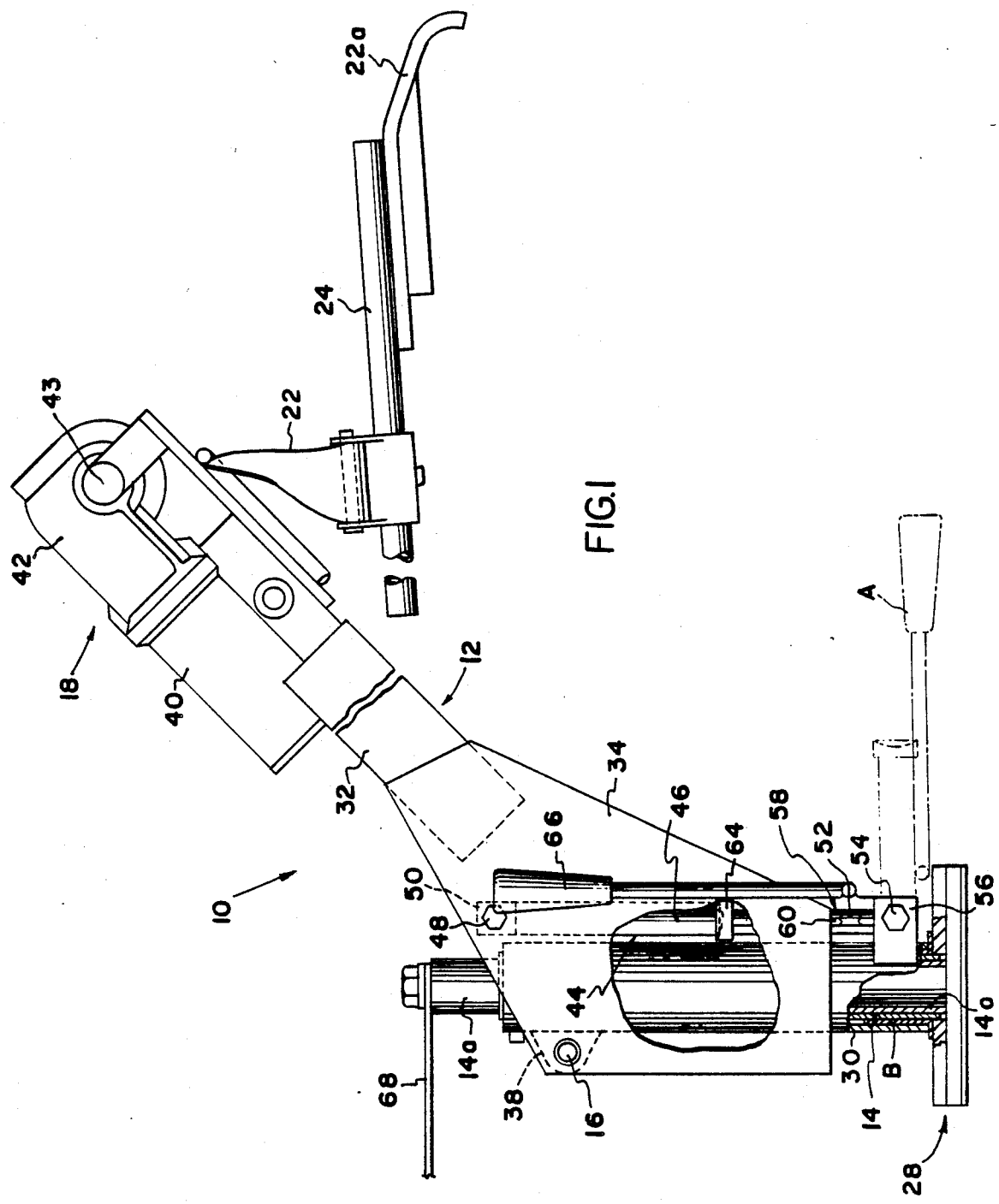
FIG. 1 is a side elevational view, with certain parts broken away or shown in section, of a lift device embodying the present invention.

The overall organization of the lifting device is best illustrated in FIG. 3 in which the lifting device designated generally 10 is shown installed in the trunk compartment T of an automobile partially indicated schematically in chain lines at V.

The lifting device 10 includes an elongate boom assembly 12 which is mounted at its lower end for swinging movement about a vertical post 14 fixedly secured in position in the vehicle trunk T. The boom is also pivotally mounted for movement about a horizontal axis at pivot 16, however, it may be held against movement about pivot pin 16 in the elevated position shown in FIG. 3 by structure to be described below. At the outer end of boom assembly 12, a reversible power driven lift mechanism designated generally 18 is mounted, mechanism 18 being powered by an electric motor which may be controlled by a push button operated control box 20 to selectively raise or lower a nylon tape 22 which can be releasably coupled via a lift fork 24 to a vehicle 26 of the type used by handicapped persons. The specific vehicle 26 illustrated in the drawings is manufactured and sold by the assignee of the present application under the trademark AMIGO and is so constructed that its seat S and steering column SC can be easily detached for storage, as illustrated in FIGS. 3 and 4.

Structural details of the lifting device 10 are best seen in FIGS. 1 and 2.

Referring first to FIG. 1, it is seen that the vertical post 14 is fixedly mounted, as by welding, upon the base plate assembly 28 by means of which the assembly 10 may be bolted to the floor of a vehicle trunk as by bolts, not shown. A cylindrical sleeve 30 is rotatably mounted on the exterior of post 14 for free rotation about its vertical axis, sleeve 30 being supported by post 14 and base plate 10 via intermediate nylon bearing elements indicated at B. Provided within post 14 is a post 14a to provide lateral column support.

Boom assembly 12 includes a rigid elongate boom element 32 (which is broken away and substantially foreshortened in FIG. 1) having a pair of spaced vertically disposed bracket plates 34 fixedly secured to its lower end as by welding. As best seen in FIG. 2, the spacing between bracket plates 34 is such that the two plates pass on opposite sides of sleeve 30. Pivot 16 passes through the opposed bracket plates 34 and a mounting bracket 38 (FIG. 1) fixedly mounted upon sleeve 30 to support the boom assembly 12 for free pivotal movement relative to sleeve 30 about the horizontal axis of pivot 16.

Referring now particularly to FIG. 1, it is seen that the lifting device 18 mounted at the outer end of boom member 32 includes a reversible electric motor 40 which is operatively connected via a gear box 42 to a drum rotatable about an axis at 43. The nylon tape 22 is wound about the drum and coupled at its free end to the lifting fork 24 which is especially adapted to couple tape 22 to the specific vehicle 26 shown in FIG. 3. Details of the lifting fork 24 and its relationship to vehicle 26 are set forth in the aforementioned co-pending application Ser. No. 202,642 and form no part of the present invention. The sole requirement is that some means such as hooks 22a be provided at the free end of fork assembly 24 to conveniently releasably connect the tape to the vehicle which is to be handled by the lift.

As best seen in FIG. 1, the pivotal mounting of boom assembly 12 at pivot pin 16 is closely adjacent one end of the boom and, with motor 40 at the opposite end of the boom, there is a substantial gravitational bias urging the boom in clockwise pivotal movement about pivot 16 as viewed in FIG. 1. To counterbalance this gravitational bias for the benefit of handicapped persons using the device, a gas spring designated generally 44 is provided. Gas spring 44 includes a cylinder 46 which is pivotally coupled at its upper end to brackets 34 by a bolt 48 which passes through both bracket plates 34 and a mounting bracket 50 fixedly attached to cylinder 46. A charge of gas under pressure within cylinder 46 is applied to a piston, not shown, in a direction such that a piston rod 52 projecting from the lower end of the cylinder is urged outwardly by the gas pressure. Piston rod 52 is pivotally coupled by means of a bolt 54 to a bracket 56 fixedly mounted on the lower end of sleeve 30. The gas pressure within cylinder 46 tends to extend piston rod 52 with a force which substantially counterbalances the gravitational movement of boom assembly 12 about pivot 16 so that the boom assembly may be manually swung up and down about pivot 16 with very little effort.

While gas spring 44 substantially counterbalances the weight of the boom assembly, it must be positively locked against downward movement when the vehicle 26 is to be supported from the boom. This positive locking action is achieved by a prop assembly designated generally 58 which, as best seen in FIG. 2, consists of a pair of rigid legs 60 pivotally mounted at their lower ends upon bolt 54. A cylinder seat 62 is mounted at the upper ends of legs 60 and is provided with a notch 64 at the side remote from the observer in FIG. 2 so that the seat can be moved to the full line position of FIGS. 1 and 2 with piston rod 52 located within notch 64. As best seen in FIGS. 1 and 2, the prop assembly 58 may thus be positioned so that the lower end of gas spring cylinder 46 is seated upon seat 62 and positively maintained against downward movement. A handle 66 may be welded to the front side of the two legs 60 to assist in manually swinging prop 58 into and out of engagement with the gas spring cylinder 46. The prop assembly may be positioned in the inoperative, stored position illustrated in chain lines in FIG. 1 at A.

As best seen in FIG. 1, the upper end of post 14A projects upwardly beyond the upper end of sleeve 30. To be sure that the post is rigidly maintained in a true vertical position, two or more straps such as 68 of rigid bar stock may be bolted to the upper end of post 14A and fixedly mounted, by means not shown, to suitable locations on the automobile frame, see FIGS. 3 and 4.

The operation of the device is believed apparent from the foregoing description. As best seen in FIG. 4, the boom is normally in a stored position, substantially flat against the trunk floor. When the boom is in this position, the prop 58 is in the position indicated at A by chain lines in FIG. 1, and does not engage the gas spring cylinder. To unload the vehicle from the trunk, boom 12 is manually raised from the stored position shown in FIG. 4 to a position slightly above the elevated position shown in FIGS. 1 and 3, and at this time handle 66 is manually manipulated to raise prop 58 into a position wherein seat 64 is located immediately below the lower end of gas spring cylinder 46. Boom 12 is then manually lowered to engage the cylinder with seat 64. Lifting tape 22 is then attached to the vehicle handlebar within the trunk via lifting fork 24, and the electrical control box is then operated to cause motor 40 of lift 18 to elevate the vehicle within the trunk to an elevation which will clear the rim of the trunk opening. Boom 12 is then manually pivoted 90° about the vertical axis of post 14 to swing the vehicle out clear of the trunk to generally the position shown in FIG. 3. The control box 20 is then operated to cause the lift device 18 to lower vehicle 26 to the ground. The reverse procedure is followed in loading.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. Lifting apparatus adapted to be mounted in an automobile trunk or the like comprising a base plate, adapted to be mounted on a fixed frame, a vertical post fixedly mounted at its lower end on said base plate, a sleeve rotatably supported on said post for free rotation about a vertical axis, an elongate boom, pivot means mounting said boom upon said sleeve for pivotal movement about a horizontal axis located adjacent one end of said boom, power driven lift means mounted on the opposite end of said boom, extensible gas spring means mounted between said sleeve and an intermediate location on said boom gravitationally counterbalancing said boom about said horizontal axis, and releasable lock means mounted on said sleeve and engageable with said gas spring means to positively maintain said gas spring means at a predetermined extended position constituting an elevated lifting position of said boom; said post projecting upwardly beyond the upper end of said sleeve, and brace means for fixedly securing the upper end of said post to said fixed frame; said boom comprising an elongate boom member, a mounting bracket including a pair of spaced plates fixedly mounted on and projecting from said boom member at said one end thereof to receive said sleeve therebetween, said pivot means being coupled to said sleeve and said bracket at the side of said sleeve remote from said boom member, said gas spring comprising a cylinder pivotally mounted at its upper end between said bracket plates at the side of said sleeve opposite said pivot means and a rod projecting from the lower end of said cylinder, said lock means comprising a rigid prop member, second pivot means commonly mounting the lower ends of said rod and said prop member on said sleeve, and a cylinder seat on the upper end of said prop member supportingly engageable with the lower end of said cylinder to maintain a predetermined extension of said rod from said cylinder.

2. Collapsible lifting apparatus adapted to be mounted in an automobile trunk or the like comprising: a base plate adapted to be mounted on a fixed frame of the automobile; a vertical post fixedly mounted at its lower end on said base plate; a vertically extending sleeve rotatably supported on said post for free rotation about a vertical axis; an elongate boom; pivot means mounting said boom upon said sleeve near the upper end thereof for pivotal movement about a horizontal axis located adjacent one end of said boom; power driven lift means mounted on the opposite end of said boom and comprising a winch with a flexible member windable on said winch and a grasping member on the free end of said flexible member member which can be secured to a vehicle for the handicapped or the like for the purpose of lifting said vehicle for the handicapped into the trunk; a laterally projecting mount on the lower end of said sleeve; a vertically extending gas spring adjacent said sleeve and parallel therewith comprising a cylinder secured to said boom at a spaced distance from said pivot means having a piston rod fixed to said mount biased to normally extend from said cylinder, the gas spring substantially gravitationally counterbalancing the weight of said boom and lift means when the latter bears no load to assist movement of said boom from a lowered position to a raised position; releasable lock means comprising a rigid member having a cylinder seat on its upper end engageable with the lower end of said cylinder to maintain a predetermined extension of said rod from said cylinder; second pivot means supporting the lower end of said rigid member from the lower end of said sleeve, and a handle member fixed to said rigid member and having a portion extending parallelly thereto such as to extend generally vertically above the said cylinder seat when the rigid member is pivoted from a lateral position in which it can rest on the trunk floor to a vertical position in which it is supportingly engageable with the lower end of the cylinder.

3. Collapsible lifting apparatus adapted to be mounted in an automobile trunk or the like comprising a base plate adapted to be mounted on a fixed frame of the automobile; a vertical post fixedly mounted at its lower end on said base plate; a vertically extending sleeve rotatably supported on said post for free rotation about a vertical axis; an elongate boom, pivot means mounting said boom upon said sleeve near the upper end thereof for pivotal movement about a horizontal axis located adjacent one end of said boom; power driven lift means mounted on the opposite end of said boom and comprising a winch with a flexible member windable on said winch and a grasping member on the free end of said flexible member which can be secured to a vehicle for the handicapped or the like for the purpose of lifting said vehicle for the handicapped into the trunk; a laterally projecting mount on the lower end of said sleeve; a vertically extending gas spring adjacent said sleeve comprising a cylinder secured to said boom at one end at a spaced distance from said pivot means and to said mount at the other, said cylinder having a piston rod biased to normally extend from said cylinder such that the gas spring substantially gravitationally counterbalances the weight of said boom and lift means when the latter bears no load to assist movement of said boom from a lowered position to a raised position; releasable lock means comprising a rigid member having a cylinder seat on its upper end releasably engageable with the lower end of said cylinder to maintain a predetermined extension of said rod from said cylinder; and means swingably supporting the lower end of said rigid member from the lower end of said sleeve, for travel from a lateral position in which it can rest on the trunk floor when the lifting apparatus is collapsed to a vertical position in which it moves under and is supportingly engageable with the lower end of the cylinder to fix the boom against downward pivoting movement.

* * * * *